US012681519B2

(12) United States Patent
Kuo

(10) Patent No.: US 12,681,519 B2
(45) Date of Patent: Jul. 14, 2026

(54) MULTI-PHASE VOLTAGE REGULATOR AND CURRENT BALANCING CIRCUIT

(71) Applicant: PowerX Semiconductor Corporation, Hsinchu County (TW)

(72) Inventor: Yueh Lung Kuo, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 203 days.

(21) Appl. No.: 18/780,507

(22) Filed: Jul. 23, 2024

(65) Prior Publication Data

US 2025/0216877 A1 Jul. 3, 2025

(30) Foreign Application Priority Data

Dec. 29, 2023 (TW) ................................. 112151750

(51) Int. Cl.
*G05F 1/573* (2006.01)
*G05F 1/575* (2006.01)
*H02M 3/158* (2006.01)

(52) U.S. Cl.
CPC .............. *G05F 1/573* (2013.01); *G05F 1/575* (2013.01); *H02M 3/1584* (2013.01); *H02M 3/1586* (2021.05)

(58) Field of Classification Search
CPC ...... G05F 1/573; G05F 1/575; H02M 3/1584; H02M 3/1586
See application file for complete search history.

(56) References Cited

U.S. PATENT DOCUMENTS

| | | | | |
|---|---|---|---|---|
| 10,727,746 | B1 * | 7/2020 | Yen ...................... | H02M 3/1584 |
| 10,749,433 | B2 * | 8/2020 | Kobayashi ........... | H02M 1/088 |
| 10,797,585 | B2 * | 10/2020 | Chen ................... | H02M 3/1584 |
| 10,924,013 | B1 * | 2/2021 | Laur ...................... | H02M 1/15 |
| 11,316,431 | B2 * | 4/2022 | Shen ................... | H02M 3/1584 |
| 2002/0185926 | A1 | 12/2002 | King et al. | |

(Continued)

FOREIGN PATENT DOCUMENTS

| | | |
|---|---|---|
| CN | 101686013 A | 3/2010 |
| CN | 116995913 A | 11/2023 |
| TW | 200949524 A | 12/2009 |

(Continued)

*Primary Examiner* — Gary A Nash
(74) *Attorney, Agent, or Firm* — CKC & Partners Co., LLC

(57) ABSTRACT

A multi-phase voltage regulator is coupled to a multi-phase DC-DC converter and comprises multiple voltage regulator circuits. The voltage regulator circuit is coupled between a power output stage circuit and a compensation circuit, and is configured to generate multiple control signals according to a compensation signal, so that the power output stage circuit generates multiple output currents. The voltage regulator circuit comprises a current comparison circuit and a delay circuit. The current comparison circuit is configured to obtain a error signal. The error signal is the difference between a threshold current and the corresponding output current. The delay circuit is is configured to generate a corresponding control signal according to the compensation signal. The delay circuit is configured to adjust a bias current in the delay circuit according to the error signal to adjust a duty cycle of the corresponding control signal.

20 Claims, 7 Drawing Sheets

(56) References Cited

U.S. PATENT DOCUMENTS

2013/0293203 A1 * 11/2013 Chen .................. H02M 3/1584
                                                       323/234
2018/0175734 A1 * 6/2018 Gherghescu ........ H02M 3/1584

FOREIGN PATENT DOCUMENTS

TW          I345359 B      7/2011
TW          M655027 U      5/2024

* cited by examiner

MULTI-PHASE VOLTAGE REGULATOR AND CURRENT BALANCING CIRCUIT

CROSS-REFERENCE TO RELATED APPLICATION

This application claims priority to Taiwan Application Serial Number 112151750, filed Dec. 29, 2023, which is herein incorporated by reference in its entirety.

BACKGROUND

Technical Field

The present disclosure relates to current balancing technology, in particular to a multi-phase voltage regulator and current balancing circuit.

Description of Related Art

A direct current converter (DC-to-DC converter) is an electromechanical device for conversion of electric energy, and is configured to convert the voltage of a DC power supply. DC-to-DC converters are extensively applied to low-power devices (e.g., batteries) or high-power devices (e.g., industrial machines). A multi-phase DC-DC converter comprises multiple converters of different phases to output power to the output terminal in turn. Whether the output power between converters corresponding to different phases is consistent will affect the power supply stability of the DC-DC converter. Therefore, it requires a new DC-DC converter to provide better power supply stability.

SUMMARY

One aspect of the present disclosure is a multi-phase voltage regulator, coupled to a multi-phase direct current converter, comprising multiple voltage regulator circuits. The voltage regulator circuits are coupled between a power output stage circuit and a compensation circuit, and are configured to generate multiple control signals according to a compensation signal, so that the power output stage circuit generates multiple output currents. One of the voltage regulator circuits comprises a current comparison circuit and delay circuit. The current comparison circuit is configured to obtain an error signal. The error signal is a difference between a threshold current and a corresponding one of the output currents. The delay circuit is coupled to the compensation circuit and the current comparison circuit, and is configured to generate a corresponding one of the control signals according to the compensation signal. The delay circuit is configured to adjust a bias current in the delay circuit according to the error signal to adjust a duty cycle of the corresponding one of the control signals.

Another aspect of the present disclosure is a multi-phase current balancing circuit, applied to a multi-phase direct current converter, comprising a current detection circuit and multiple voltage regulator circuits. The current detection circuit is coupled to a power output stage circuit of the multi-phase direct current converter to receive multiple output currents and a threshold current. The voltage regulator circuits are coupled to between the current detection circuit and a compensation circuit of the multi-phase direct current converter, and are configured to generate multiple control signals according to a compensation signal, so that the power output stage circuit generates the output currents. One of the voltage regulator circuits comprises a current comparison circuit and a delay circuit. The current comparison circuit is configured to obtain an error signal. The error signal is a difference between the threshold current and a corresponding one of the output currents. The delay circuit is coupled to the compensation circuit and the current comparison circuit, and is configured to generate a corresponding one of the control signals according to the compensation signal. The delay circuit is configured to adjust a bias current in the delay circuit according to the error signal to adjust a duty cycle of the corresponding one of the control signals.

The present disclosure adjusts the duty cycle of the control signal by the difference between the first output current and the average current to achieve the purpose of maintaining balance among the output currents corresponding to different phases without changing levels of a response voltage or a ramp voltage.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" comprises an associated listed items or any and all combinations of more.

The present disclosure relates to a multi-phase DC-DC converter (multi-phase direct current converter), which is used to convert an input voltage to output output voltages with different voltage levels. In one embodiment, the multi-phase DC-DC converter is used in vehicle power supply, for example, as a power transmission circuit to store power from a charging pile into a battery, or to provide power stored in the battery to in-vehicle device. However, the present disclosure is not limited thereto. In other embodiments, the multi-phase DC-DC converter can also be applied to other devices and loads.

Figure 1A:
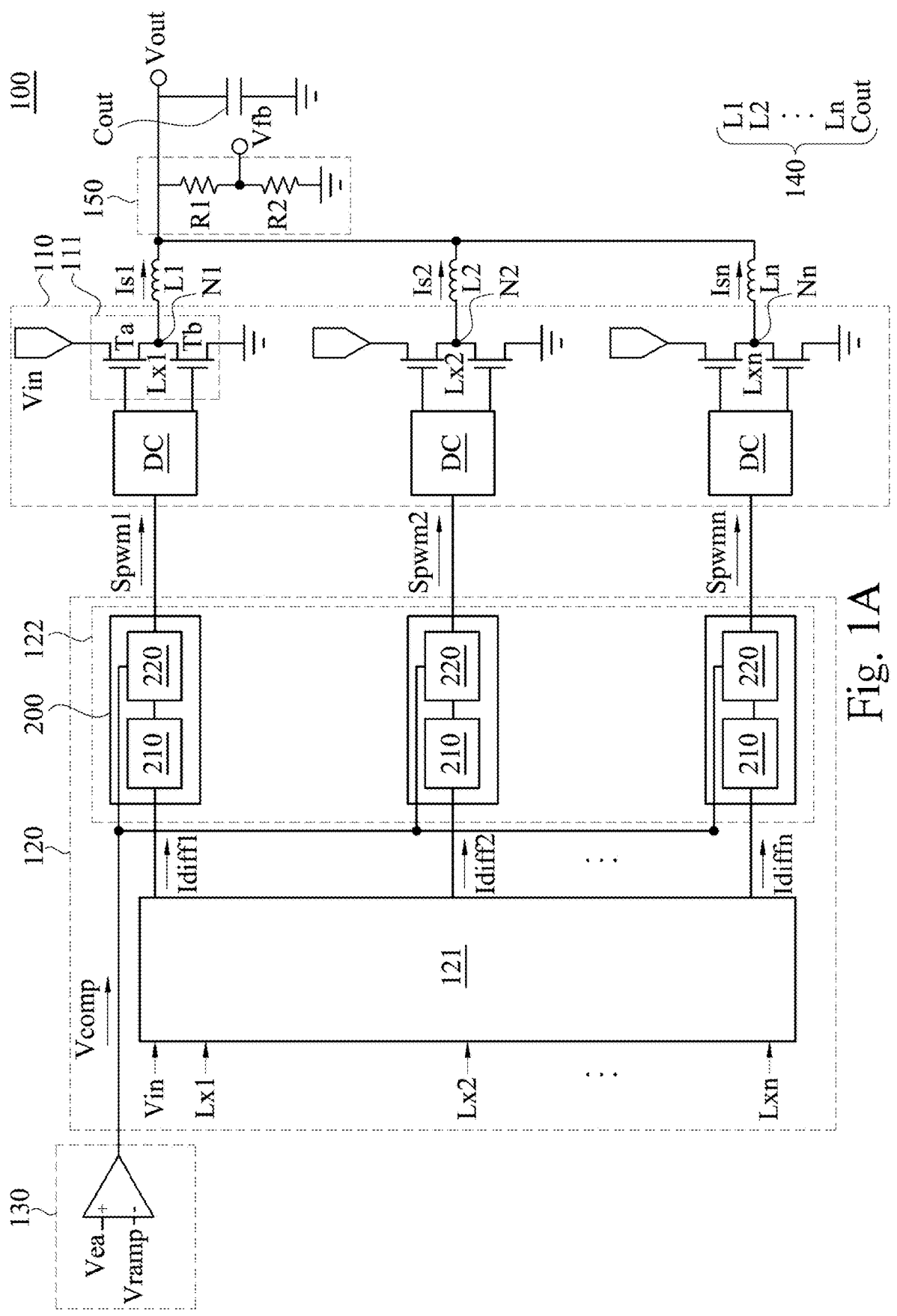
FIG. 1A is a schematic diagram of a multi-phase direct current converter in some embodiments of the present disclosure.

FIG. 1A is a schematic diagram of a multi-phase DC-DC converter 100 (multi-phase direct current converter) in some embodiments of the present disclosure. The multi-phase DC-DC converter 100 comprises a power output stage circuit 110, a current balancing circuit 120 and a compensation circuit 130. The power output stage circuit 110 comprises multiple driving circuits DC and multiple switching circuits 111 formed by multiple transistor switches. One driving circuit DC and the corresponding switching circuit 111 are configured to generate corresponding one of output currents Is1~Isn according to the input voltage Vin.

In the embodiment shown in FIG. 1A, the power output stage circuit 110 comprises multiple subcircuits (e.g., two or more). Each subcircuit comprises a driving circuit DC and a switching circuit 111. In each subcircuit, the switching circuit 111 comprises a high~side switch Ta and a low-side switch Tb, and is coupled to an input voltage Vin. The driving circuit DCs are configured to control the respective high-side switches Ta and the respective low-side switches Tb to be turned on or off according to the received control signals to generate or adjust the corresponding output currents Is1~Isn. The output currents Is1~Isn generated by the subcircuits have different phases. For example, when the power output stage circuit 110 comprises multiple subcircuits, there is a corresponding phase difference between the output currents Is1~Isn of the subcircuits.

In one embodiment, the power output stage circuit 110 generates an output voltage Vout and a feedback voltage Vfb by an energy storage circuit 140 and a voltage divider circuit 150. The energy storage circuit 140 is coupled to an output terminal of the power output stage circuit 110, and comprises multiple inductors L1~Ln and an output capacitor Cout to output the output voltage Vout according to the output currents Is1~Isn. The voltage divider circuit 150 is coupled to the power output stage circuit 110 and the energy storage circuit 140, and comprises multiple voltage dividing resistors R1 and R2. The voltage divider circuit 150 is configured to divide the output voltage Vout to generate the feedback voltage Vfb. Since people skilled in the art can understand method of generating the output voltage Vout by the multi-phase DC-DC converter 100, it will not be described here.

The current balancing circuit 120 is coupled to the power output stage circuit 110, and comprises a current detection circuit 121 and a multi-phase voltage regulator 122. The current balancing circuit 120 is configured to generate and adjust multiple control signals Spwm1~Spwmn corresponding different phases, so that the power output stage circuit 110 generate multiple output currents Is1~Isn of different phases accordingly, thereby keeping the currents of different phases balanced. The generation method of the control signal will be detailed in the subsequent paragraphs.

The current balancing circuit 120 is coupled to the compensation circuit 130 and the power output stage circuit 110. The compensation circuit 130 is configured to receive a response voltage Vea from the power output stage circuit 110, and generate a compensation signal Vcomp. The response voltage Vea is generated according to a difference between the feedback voltage Vfb provided by the output terminal of the multi-phase DC-DC converter 100 and a reference voltage (e.g., a preset fixed voltage). Specifically, in one embodiment, a result of the feedback voltage Vfb generated by the the power output stage circuit 110 minus the reference voltage is used as the response voltage Vea. In other embodiments, the power output stage circuit 110 can directly use the feedback voltage Vfb as the response voltage Vea.

The compensation circuit 130 is configured to compare the response voltage Vea with a ramp voltage Vramp to generate the compensation signal Vcomp according to a difference between the response voltage Vea and the ramp voltage Vramp. The compensation signal Vcomp is configured to represent a current status of the output voltage Vout (e.g., a heavy load or light load status). After the compensation signal Vcomp is provided to the current balancing circuit 120, the current balancing circuit 120 generates the control signals Spwm1~Spwmn according to the compensation signal Vcomp.

As mentioned above, in one embodiment, a positive terminal of the compensation circuit 130 is configured to receive the response voltage Vea, and a negative terminal of the compensation circuit 130 is configured to receive the ramp voltage Vramp. Therefore, the intensity of the compensation signal Vcomp is positively related to "a difference between the response voltage Vea and the ramp voltage Vramp". However, the present disclosure is not limited to this. In other embodiments, the signals received by the positive and negative terminals of the compensation circuit 130 can be interchanged according to the actual circuit design.

In one embodiment, the ramp voltage Vramp can be a periodic signal, and the intensity of the ramp voltage Vramp is changed periodically within a signal cycle. In some other embodiments, the ramp voltage Vramp can be a sawtooth wave with a fixed slope in signal cycles. The "sawtooth wave" starts to be changed (e.g., the "sawtooth wave" starts to rise or fall) from a fixed level within each signal cycle, and returns to the original fixed level at the end of the current signal cycle and the beginning of the next signal cycle. In some embodiments, the ramp voltage Vramp has a positive slope, that is, in a signal cycle, a level of the ramp voltage Vramp rises gradually. However, the present disclosure is not limited hereto. In other embodiments, the ramp voltage Vramp may be a triangular wave according to different slopes.

In one embodiment of the present disclosure, the current balancing circuit 120 comprises multiple voltage regulator circuits 200, and the voltage regulator circuits 200 selectively change multiple time points at which the levels of the control signals Spwm1~Spwmn are changed according to a power supply status of the multi-phase DC-DC converter 100 (according to the compensation signal Vcomp and/or the output current for example) to ensure that the currents corresponding to different phases output by the multi-phase DC-DC converter 100 remain balanced (i.e., the output currents corresponding to different phases remain substantially equal). For ease of explanation, the voltage regulator circuits 200 corresponding to multiple phases in the multi-phase DC-DC converter 100 are collectively referred to as a multi-phase voltage regulator.

As shown in FIG. 1A, in this embodiment, the current balancing circuit 120 comprises a current detection circuit 121 and a multi-phase voltage regulator 122. The current detection circuit 121 is coupled to the power output stage circuit 110 to receive the output currents Is1~Isn and a threshold current. The current detection circuit 121 is further configured to generate multiple error signals, which are provided to multiple voltage regulator circuits 200, according to the threshold current and the output currents Is1~Isn.

In one embodiment, the threshold current can be an average value or a median value of the driving currents generated by the power output stage circuit 110. In other words, the threshold current is calculated by the current detection circuit 121, but the present disclosure is not limited hereto. In other embodiments, the threshold current can be a preset fixed current value, such as an ideal value of the output current that is generated when the multi-phase DC-DC converter 100 is operating normally. In some variations of the present disclosure, the threshold current may be obtained by searching a look-up table. For example, the threshold current is obtained by searching a look-up table according to a level of the input voltage Vin.

In one embodiment, one error signal is a difference between the threshold current and one of the output currents Is1~Isn, as the error currents Idiff1~Idiffn shown in FIG. 1A. In other embodiments, the current detection circuit 121 is configured to perform signal processing on the threshold current and output currents to generate the respective error signals and respectively output the error signals to the corresponding voltage regulator circuits 200.

Specifically, in some embodiments, the current detection circuit 121 detects multiple phase nodes N1~Nn between the high-side switches Ta and the low-side switches Tb in the power output stage circuit 110 to obtain voltages Lx1~Lxn of the phase nodes N1~Nn, and calculates the corresponding output currents. At the same time, the current detection circuit 121 further calculates an average current of the multiple output currents as the threshold current.

Figure 1B:
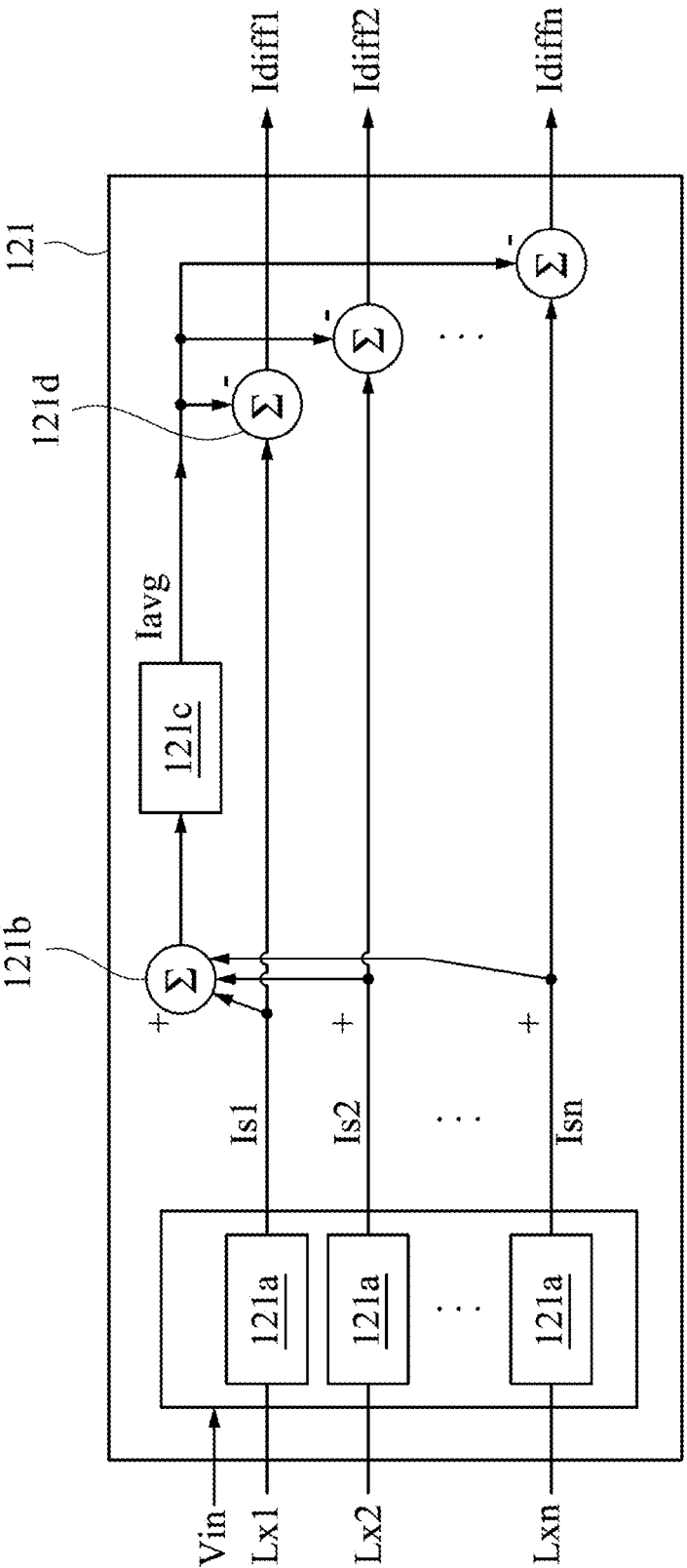
FIG. 1B is a schematic diagram of a current detection circuit in some embodiments of the present disclosure.

FIG. 1B is a schematic diagram of a current detection circuit 121 in some embodiments of the present disclosure. As shown in FIGS. 1A and 1B, the current detection circuit 121 comprises transconductance circuits 121*a*, a adder circuit 121*b*, a divider circuit 121*c* and subtractor circuits 121*d*. The transconductance circuits 121*a* are coupled to the power output stage circuit 110 to receive the output currents Is1~Isn. In one embodiment, the transconductance circuits 121*a* comprise respective transconductance amplifiers to receive voltages Lx1~Lxn of the phase nodes N1~Nn and then calculate the output currents Is1~Isn, respectively.

The adder circuit 121*b* is coupled to the transconductance circuits 121*a* and configured to receive the output currents Is1~Isn. The divider circuit 121*c* calculates the average current Iavg of the output currents Is1~Isn. Each subtractor circuit 121*d* is coupled to the divider circuit 121*c* and further configured to calculate a difference between the output current of corresponding phase and the average current Iavg. Thus, the subtractor circuits 121*d* generate the error currents Idiff1~Idiffn, respectively.

The multi-phase voltage regulator 122 comprises multiple voltage regulator circuits 200, and is coupled between the compensation circuit 130 and the current detection circuit 121. The multi-phase voltage regulator 122 is configured to receive the error signals and the compensation signal Vcomp. As mentioned above, the error signals provided by the current detection circuit 121 can be the error currents Idiff1~Idiffn calculated by the current detection circuit 121, or can be the respective calculation results for the threshold current and the corresponding output currents provided by the current detection circuit 121. The multi-phase voltage regulator 122 is configured to generate multiple control signals Spwm1~Spwmn corresponding to different phases according to the error signals and the compensation signal Vcomp, so that the power output stage circuit 110 generates the output currents Is1~Isn. In addition, the voltage regulator circuit 200 selectively changes multiple time points at which the levels of the corresponding control signal are changed (e.g., delayed or advanced), so that multiple output currents Is1~Isn corresponding to different phases can remain balanced.

In one embodiment, the multi-phase voltage regulator 122 comprises multiple voltage regulator circuits 200, and the voltage regulator circuit 200 are configured to generate the respective control signals Spwm1~Spwmn of the output currents Is1~Isn with different phases, and provide the respective control signals Spwm1~Spwmn to the corresponding driving circuits DC.

In some embodiments, the control signals Spwm1~Spwmn generated by the voltage regulator circuits 200 can be pulse-width modulation (PWM) signals. The voltage regulator circuits 200 further adjust the duty cycle of the respective control signals Spwm1~Spwmn to change the intensity of the output currents Is1~Isn generated by the power output stage circuit 110. Since people in the art can understand method of transmitting the control signal between the power output stage circuit 110 and the current balancing circuit 120 using digital signals, it will not be described here.

Figure 2:
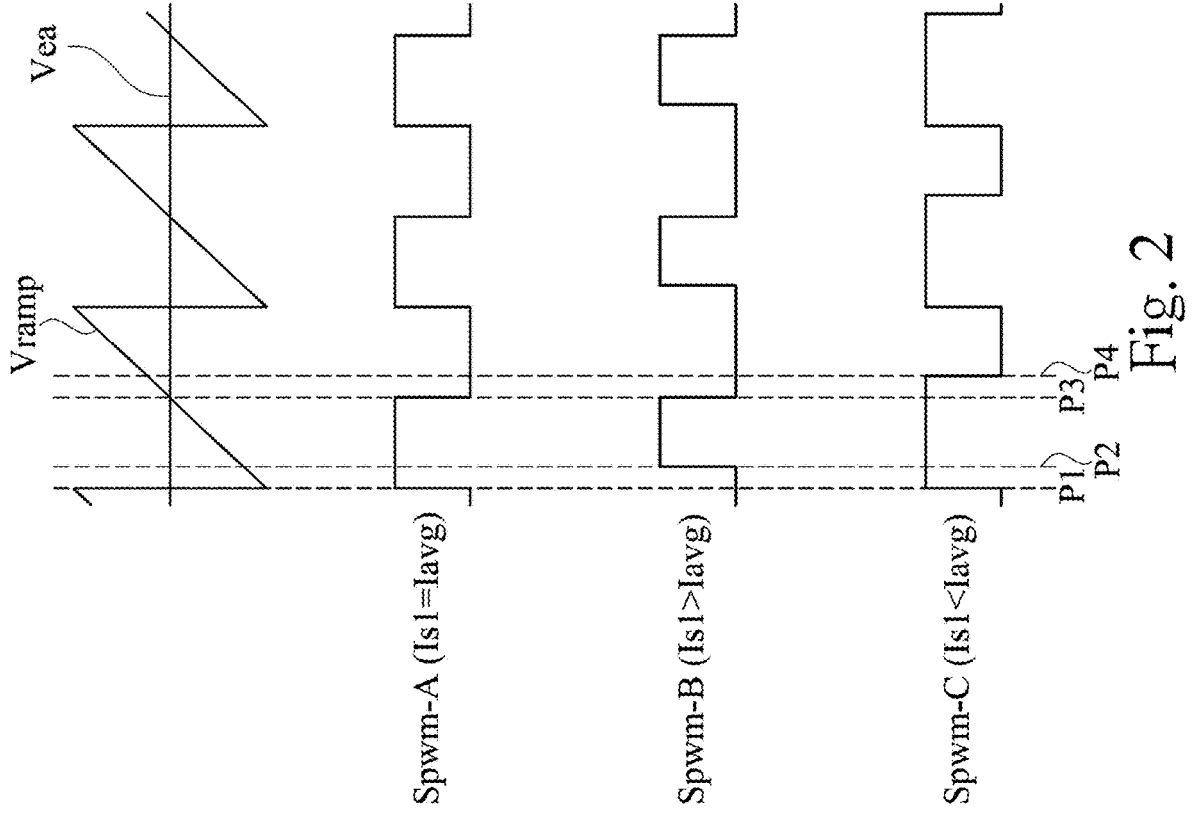
FIG. 2 is a waveform diagram of a control signal in some embodiments of the present disclosure.

FIG. 2 illustrates "by controlling the time points at which the levels of the control signals Spwm1~Spwmn are changed, ensure that the currents of different phases output by the multi-phase DC-DC converter 100 remain balanced" according to some embodiments of the present disclosure. Referring to FIG. 1A and FIG. 2, the current balancing circuit 120 and the voltage regulator circuit 200 that control the output current Is1 are used as examples for explanation. In FIG. 2, the waveforms Spwm-A~Spwm-C respectively represent the changes in the waveforms of the control signal Spwm1 under different conditions. The waveform Spwm-A represents a waveform under the condition where the first output current Is1 is equal to the average current Iavg. The waveform Spwm-B represents a waveform under the condition where the control signal Spwm1 should be adjusted (that is, the duty cycle of the control signal Spwm1 is decreased) when the first output current Is1 is greater than the average current Iavg. The waveform Spwm-C represents a waveform under the condition where the control signal Spwm1 should be adjusted (that is, the duty cycle of the control signal Spwm1 is increased) when the first output current Is1 is less than the average current Iavg.

As shown in FIG. 2, a time point at which the response voltage Vea and the ramp voltage Vramp are at the same level is the time point at which the level of the control signal Spwm1 as changed. In other words, "the time point at which the response voltage Vea and the ramp voltage Vramp are at the same level" is related to the duty cycle of the control signal Spwm1. As shown in the waveform Spwm-A, when the ramp voltage Vramp decreases from a high level to a level that is the same as or lower than the level of the response voltage Vea (i.e., the time point P1), the control signal Spwm1 is changed from a low level to a high level. When the ramp voltage Vramp increases from another low level to a level that is the same as or higher than the level of the response voltage Vea (i.e., the time point P3), the control signal Spwm1 is changed from the high level to the low level. Please note that the present disclosure does not adjust the duty cycle of the control signal Spwm1 by changing the response voltage Vea or the ramp voltage Vramp. Instead, the duty cycle of the control signal Spwm1 is adjusted by the difference between the output current Is1 and the average current Iavg to achieve the purpose of maintaining balance among currents corresponding to different phases.

Referring to FIG. 2, for example, in a positive half cycle when the power output stage circuit 110 is configured to operate (for the waveform Spwm-A, the positive half cycle is the time point P1 to the time point P3), the control signal Spwm1 is at the high level and the ramp voltage Vramp is less than the response voltage Vea, the high-side switch Ta is turned on and the low-side switch Tb is turned off. The input voltage Vin charges the output capacitor Cout and the inductor L1 to form an output current Is1 flowing from the phase node N1 to the output capacitor Cout. Then, the current detection circuit 121 receives the voltages Lx1~Lxn of the phase nodes N1~Nn and calculates the output currents Is1~Isn according to the voltages Lx1~Lxn. As shown in FIG. 1B and FIG. 2, the current detection circuit 121 compares the output currents Is1~Isn with the current average of these currents (i.e., the average current Iavg, or the aforementioned threshold current). For example, when the output current Is1 is greater than the average current Iavg, the duty cycle of the control signal Spwm1 should be decreased to decrease the output current Is1. Therefore, the voltage regulator circuit 200 corresponding to the control signal Spwm1 delays a time point at which the control signal Spwm1 increase from low level to high level (e.g., as shown in the waveform Spwm-B, the time point is delayed from the time point P1 to the time point P2) to decrease the duty cycle of the control signal Spwm1. Accordingly, by decreasing the duty cycle of the control signal Spwm1, the time during which the high-side switch Ta is turned on is shortened, thereby decreasing the output current Is1.

Similarly, when the output current Is1 is less than the average current Iavg, the duty cycle of the control signal Spwm1 should be increased to increase the output current Is1. Therefore, the voltage regulator circuit 200 corresponding to the control signal Spwm1 delays the time point at which the control signal Spwm1 decreases from the high level to the low level (for example, as shown in the waveform Spwm-C, the time point is delayed from the time point P3 to the time point P4) to increase the duty cycle of the control signal Spwm1. Accordingly, by increasing the duty cycle of the control signal Spwm1, the time during which the high-side switch Ta is turned on becomes longer, thereby increasing the output current Is1.

The following describes the method and corresponding circuit of the voltage regulator circuit 200 configured to adjust the time point at which the levels of the control signals Spwm1~Spwmn are changed. As shown in FIG. 1A, the voltage regulator circuit 200 comprises a current comparison circuit 210 and a delay circuit 220, and the current comparison circuit 210 is coupled to the delay circuit 220. The current comparison circuit 210 is coupled to the current detection circuit 121 to obtain one error signal. For example, the current comparison circuit 210 receives the corresponding one of the error currents Idiff1~Idiffn from the current detection circuit 121, or receives the threshold current (e.g., the average current, referring to the average current Iavg in FIG. 3A) and the corresponding output current (referring to the output current Is1 in FIG. 3A) from the current detection circuit 121.

The delay circuit 220 is coupled to the compensation circuit 130 and the current comparison circuit 210, and is configured to generate the corresponding control signal according to the compensation signal Vcomp. The delay circuit 220 is further configured to adjust a bias current in the delay circuit according to the error signal (e.g., a corresponding error current Idiff1, or the average current Iavg and the output current Is1 as shown in the subsequent FIG. 1B and FIG. 3A) to adjust the duty cycle of the corresponding control signal.

The present disclosure uses the error signals to confirm the current status of the respective output currents corresponding to different phases (e.g., too large or too small), and then selectively changes the time points at which the levels of the corresponding control signal are changed, such as changing the time point at which the control signal enters the high level, or changing the time point at which the control signal enters the low level. Accordingly, the duty cycle of the control signal can be adjusted to achieve the purpose of maintaining balance among currents corresponding to different phases.

In some embodiments, the multi-phase DC-DC converter 100 achieves the purpose of "controlling the time points at which levels of signals are changed" by controlling phases of signals at control nodes in the delay circuits 220. In other embodiments, the multi-phase DC-DC converter 100 achieves the purpose of "controlling the time points at which levels of signals are changed" by controlling threshold voltages of circuit elements in the delay circuit 220. Each control method of the present disclosure will be explained through the embodiments in FIGS. 3A, 3B, 4A, and 4B.

Figure 3A:
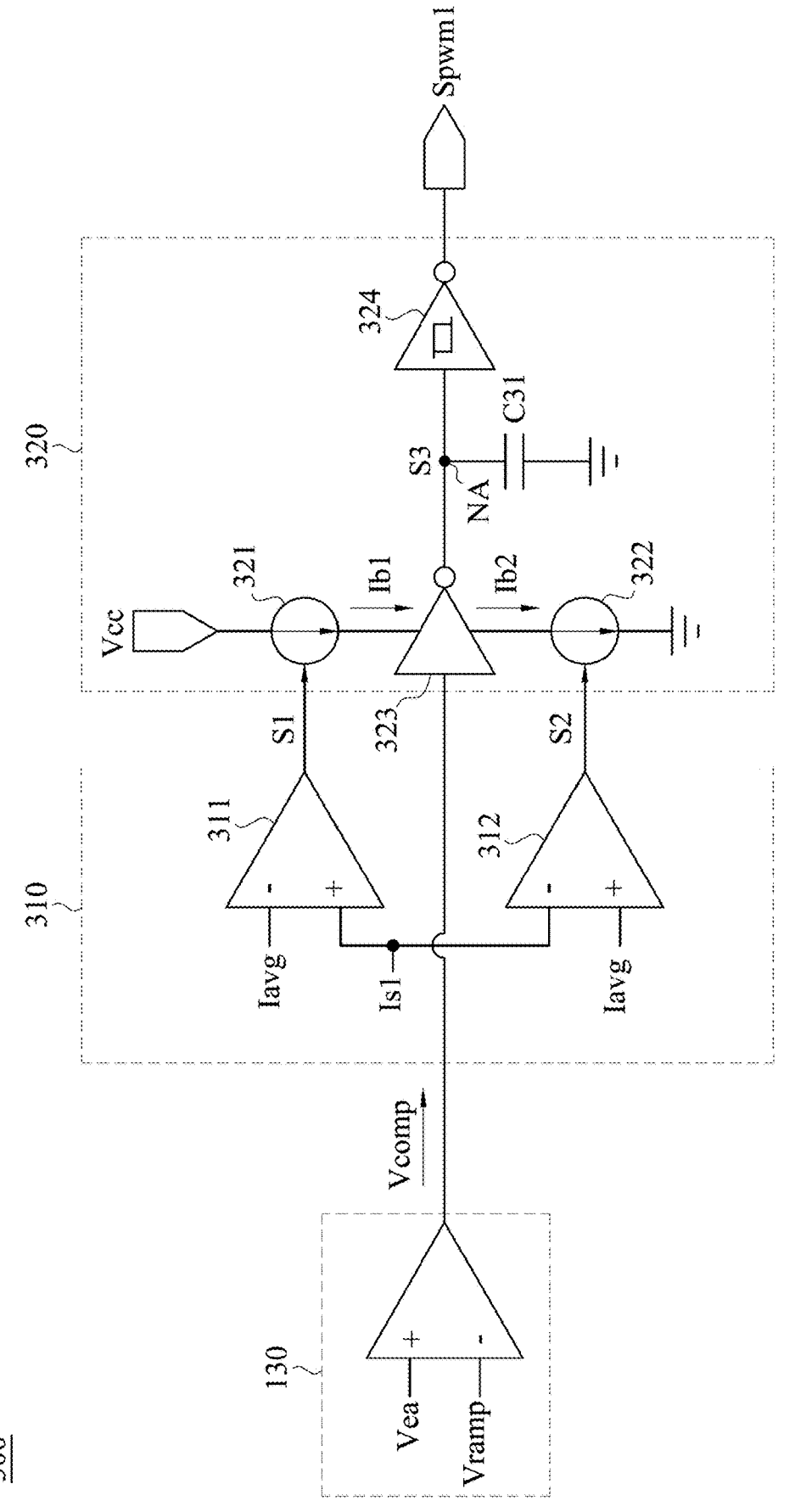
FIG. 3A is a schematic diagram of a voltage regulator circuit in some embodiments of the present disclosure.

FIG. 3A is a schematic diagram of a voltage regulator circuit 300 in some embodiments of the present disclosure, which can be applied to the multi-phase DC-DC converter 100 shown in FIG. 1A. The voltage regulator circuit shown in FIG. 3A can be an example of the voltage regulator circuit 200 shown in FIG. 1A. The voltage regulator circuit 300 comprises a current comparison circuit 310 and a delay circuit 320. The current comparison circuit 310 is coupled to the delay circuit 320. The current comparison circuit 310 is coupled to the current detection circuit 121, and is configured to receive the average current Iavg and the output current Is1. The delay circuit 320 is coupled to the compensation circuit 130 and the current comparison circuit 310, and adjusts a phase of a signal (referred to as a node signal S3) at a control node NA in the delay circuit 320 according to the error signal to adjust the duty cycle of the corresponding control signal. The current comparison circuit 310 and the delay circuit 320 may be examples of the current comparison circuit 210 and the delay circuit 220, respectively.

As shown in FIG. 3A, in one embodiment, the current comparison circuit 310 comprises a first current comparator 311. The first current comparator 311 is coupled to the current detection circuit 121. A first terminal (e.g., a negative terminal) of the first current comparator 311 is configured to receive the threshold current (the average current Iavg in this embodiment). A second terminal (e.g., a positive terminal) of the first current comparator 311 is configured to receive the corresponding output current Is1. The first current comparator 311 generates a first error signal S1 according to a difference between the average current Iavg and the output current Is1.

As mentioned above, in one embodiment, the delay circuit 320 comprises a first current source circuit 321 which is configured to provide a first bias current Ib1 according to the power supply Vcc. The first current source circuit 321 is further configured to receive the first error signal S1 generated by the first current comparator 311, and change the intensity of the output first bias current Ib1 according to the first error signal S1. In some embodiments, the first error signal S1 can be a voltage signal, and is configured to change the intensity of the first bias current Ib1.

Similarly, in one embodiment, the current comparison circuit 310 further comprises a second current comparator 312. The second current comparator 312 is coupled to the current detection circuit 121 and an inverter 323. A first terminal (e.g., a negative terminal) of the second current comparator 312 is configured to receive the corresponding output current Is1. A second terminal (e.g., a positive terminal) of the second current comparator 312 is configured to receive the threshold current (the average current Iavg in this embodiment). The second current comparator 312 generates the second error signal S2 according to a difference between the average current Iavg and the output current Is1.

As mentioned above, the delay circuit 320 further comprises a second current source circuit 322 which is configured to provide a second bias current Ib2 according to the power supply Vcc. The second current source circuit 322 is coupled to the second current comparator 312 and the inverter 323. The second current source circuit 322 is configured to receive the second error signal S2 generated by the second current comparator 312, and change the intensity of the output second bias current Ib2 according to the second error signal S2. It is worth mentioning here that both of the first current comparator 311 and the second current comparator 312 are configured to receive the corresponding output current Is1 and the average current Iavg, but the receiving positions (i.e., the positive and negative terminals) are opposite, so the first error signal S1 and the second error signal S2 will have different logic levels. In some other embodiments, the current comparison circuit 310 can be omitted. Under this configuration, the first current source circuit 321 and the second current source circuit 322 can be directly coupled to the current detection circuit 121 to receive the corresponding one of the error currents Idiff1~Idiffn, such as the error current Idiff1 Then, the first current source circuit 321 directly uses the error current Idiff1 as the first error signal S1, and the second current source circuit 322 uses the current inverse to the error current Idiff1 as the second error signal S2. Or, the first current source circuit 321 directly uses the error current Idiff1 as the second error signal S2, and the second current source circuit 322 uses the current inverse to the error current Idiff1 as the first error signal S1.

Specifically, as shown in FIG. 3A, the delay circuit 320 comprises the inverter 323, and further comprises a delay capacitor C31 and a hysteresis comparator 324. An input terminal of the inverter 323 is coupled to the output terminal of the compensation circuit 130, and is configured to receive the compensation signal Vcomp. An output terminal of the inverter 323 is coupled to the control node NA to output the node signal S3. A first correction terminal of the inverter 323 is coupled to the first current source circuit 321 to receive the first bias current Ib1. A second correction terminal of the inverter 323 is coupled to the second current source circuit 322 to receive the second bias current Ib2. The inverter 323 is configured to control charge or discharge of the delay capacitor C31 according to the first bias current and/or the second bias current control to adjust the phase of the node signal S3 of the control node NA.

The delay capacitor C31 is coupled between the output terminal (e.g., the control node NA) of the inverter 323 and a reference terminal (e.g., ground). When the first error signal S1 is at a high level, the delay capacitor C31 is configured to delay a time point at which the node signal S3 is changed from a high logic level to a low logic level. When the first error signal S1 is at a low level, the delay capacitor C31 is configured to delay a time point at which the node signal S3 is changed from the low logic level to the high logic level.

The hysteresis comparator 324 is coupled to the output terminal of the inverter 323 (that is, the control node NA), and is configured to generate the corresponding control signal Spwm1 according to the node signal S3. In one embodiment, the hysteresis comparator 324 can be implemented by a Schmitt trigger.

Figure 3B:
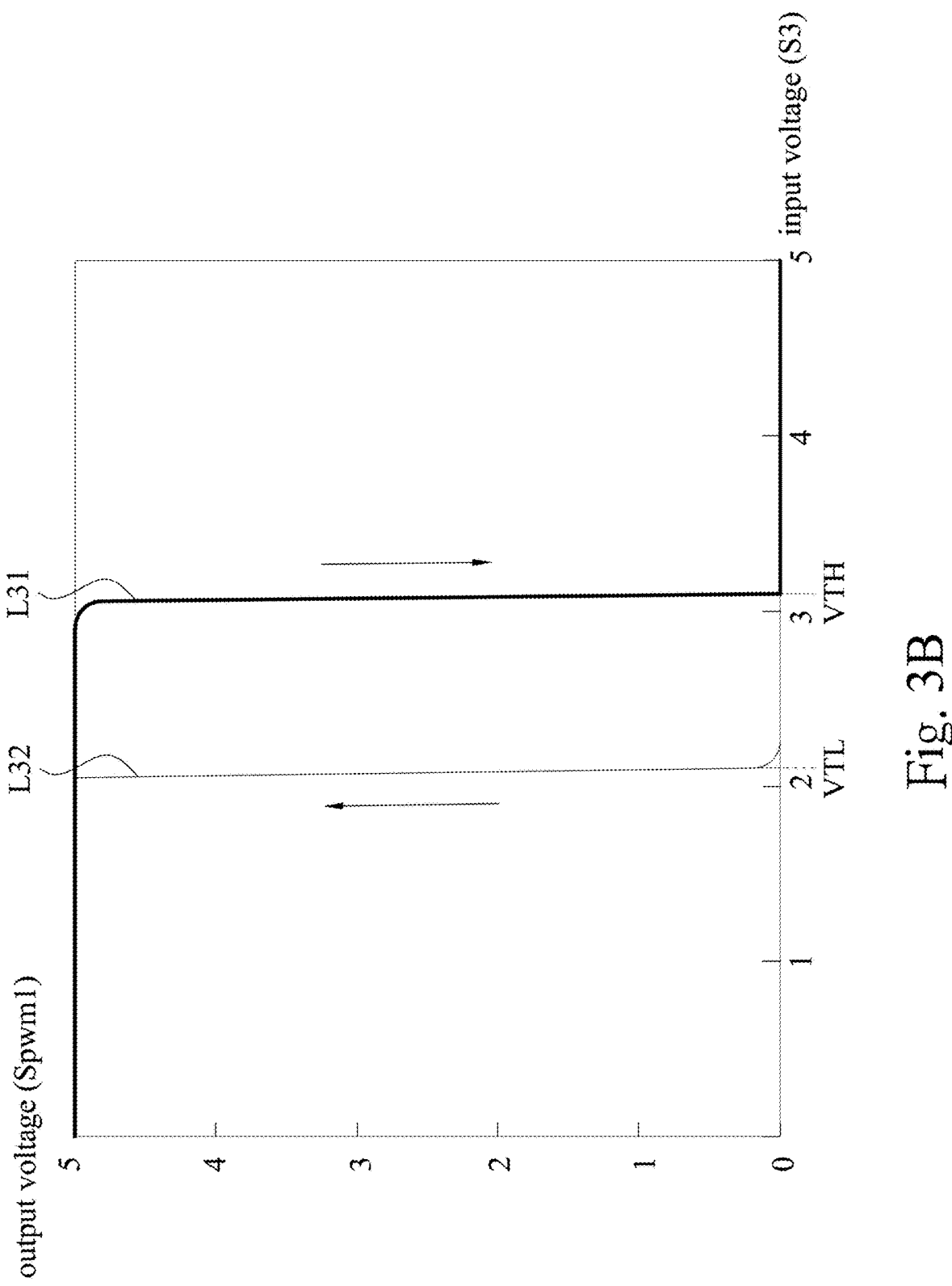
FIG. 3B is a voltage characteristic diagram of a hysteresis comparator in some embodiments of the present disclosure.

FIG. 3B is a voltage characteristic diagram of a hysteresis comparator 324 in some embodiments of the present disclosure. The horizontal axis represents the input voltage (i.e., the node signal S3) received by the hysteresis comparator 324, and the vertical axis represents the output voltage (i.e., the control signal Spwm1) output by the hysteresis comparator 324. The voltage characteristics of the hysteresis comparator 324 show a hysteresis curve. When the input voltage of the hysteresis comparator 324 increases to a first threshold voltage VTH, the output voltage is changed to a low level (e.g., shown in characteristic curve L31). When the input voltage of the hysteresis comparator 324 decreases to a second threshold voltage VTL, the output voltage is changedl changed to a high level (e.g., as shown in characteristic curve L32). When the input voltage of the hysteresis comparator 324 is between the first threshold voltage VTH and the second threshold voltage VTL, the output voltage is not changed. Since people in the art can understand the characteristics and implementation of the hysteresis comparator 324, it will not be described here.

Referring to FIGS. 1A, 2 and 3A~3B, the following describes the operation of the delay circuit 320 that adjusts the bias current in the delay circuit according to the error signal, thereby changing the duty cycle of the corresponding control signal. As shown in FIG. 2, when the power output stage circuit operates in the positive half cycle, that is, when the response voltage Vea is greater than the ramp voltage Vramp, the compensation signal Vcomp is at a high level, and the node signal S3 output by the inverter 323 should change to the low logic level. If the output current Is1 is greater than the average current Iavg at this time, then the first error signal S1 is at a high level, and the second error signal S2 is at a low level. Thereby, the first current source circuit 321 is controlled to increase the first bias current Ib1, and the second current source circuit 322 is controlled to decrease the second bias current Ib2. When the first bias current Ib1 becomes larger and the second bias current Ib2 becomes smaller, the delay capacitor C31 will be additionally charged. Therefore, the time point at which the node signal S3 decreases to the low logic level (to at least the second threshold voltage VTL) will become slower. That is, the time point at which the hysteresis comparator 324 converts the received node signal S3 with the low logic level into the control signal Spwm1 with the high level will be delayed. As shown in the waveform Spwm-B shown in FIG. 2, the time point at which the control signal Spwm1 increases to the high level will be delayed from the original time point P1 to the time point P2. Accordingly, it is equivalent to decreasing the duty cycle of the control signal Spwm1. When the duty cycle of the control signal Spwm1 decreases, the time during which the high-side switch Ta is turned on becomes shorter, thus decreasing the output current Is1, achieving the purpose of maintaining balance among currents corresponding to different phases.

As for the power output stage circuit 110 operating in the positive half cycle, refer to the waveform Spwm-C, if the output current Is1 is less than the average current Iavg, the first bias current Ib1 will decrease and the second bias current Ib2 will increase, and the delay capacitor C31 will be discharged smoothly, so the time at which the node signal S3 is switched to the low logic level (to at least the second threshold voltage VTL) is not affected. That is, the time point at which the control signal Spwm1 is switched to the high level is not affected, so in the positive half cycle, the time point at which the waveform Spwm-C is switched to the high level is the same as the time point at which the waveform Spwm-A is switched to the high level.

Next, as shown in FIG. 2, when the power output stage circuit 110 operates in a negative half cycle, that is, when the response voltage Vea is less than the ramp voltage Vramp, the compensation signal Vcomp is at the low level, and the node signal S3 output by the inverter 323 should be changed to the high logic level. If the output current Is1 is less than the average current Iavg at this time, then the first error signal S1 is at the low level and the second error signal S2 is at the high level, so that the first current source circuit 321 is controlled to decrease the first bias current Ib1 and the second current source circuit 322 is controlled to increase the second bias current Ib2. When the first bias current Ib1 becomes smaller and the second bias current Ib2 becomes larger, the delay capacitor C31 will be additionally discharged. Therefore, the time point at which the level of the node signal S3 increases to the high logic level (to at least the first threshold voltage VTH to make the output voltage of the hysteresis comparator 324 changed, refer to the principle shown in FIG. 3B) will become slower. That is, the time point at which the hysteresis comparator 324 converts the received node signal S3 with the high logic level into the control signal Spwm1 with the low level will be delayed, as shown in the waveform Spwm-C shown in FIG. 2, at this time, the time point at which the control signal Spwm1 decreases to the low level will be delayed from the original time point P3 to the time point P4. Accordingly, it is equivalent to increasing the duty cycle of the control signal Spwm1. When the duty cycle of the control signal Spwm1 increases, the time during which the high-side switch Ta is turned on becomes longer, thus increasing the output current Is1 to achieve the purpose of maintaining balance among currents corresponding to different phases.

As for the power output stage circuit 110 operating in the negative half cycle, if the output current Is1 is greater than the average current Iavg, the first bias current Ib1 will increase and the second bias current Ib2 will decrease, so that the delay capacitor C31 will be charged smoothly. Therefore, the time point at which the node signal S3 is switched to the high logic level (to at least the first threshold voltage VTH) is not affected, so the time point at which the waveform Spwm-B is switched to the low level is the same as the time point at which the waveform Spwm-A is switched to the low level in the negative half cycle.

In the aforementioned embodiments, the voltage regulator circuit 300 comprises the first current comparator 311, the second current comparator 312, the first current source circuit 321 and the second current source circuit 322. The first current comparator 311 and the corresponding first current source circuit 321 are configured to generate the first bias current Ib1 to change a change time of the phase of the node signal S3 at the control node NA. Similarly, the second current comparator 312 and the corresponding second current source circuit 322 are configured to generated the second bias current Ib2 to change the change time of the phase of the node signal S3 at the control node NA. However, in other embodiments, the voltage regulator circuit 300 may have the first bias current Ib1 or the second bias current Ib2, which can change the change time of the phase of the node signal S3 at the control node NA. In other words, in other embodiments, the voltage regulator circuit 300 may only comprise the first current comparator 311 and the corresponding first current source circuit 321, or only comprise the second current comparator 312 and the corresponding second current source circuit 322.

Figure 4A:
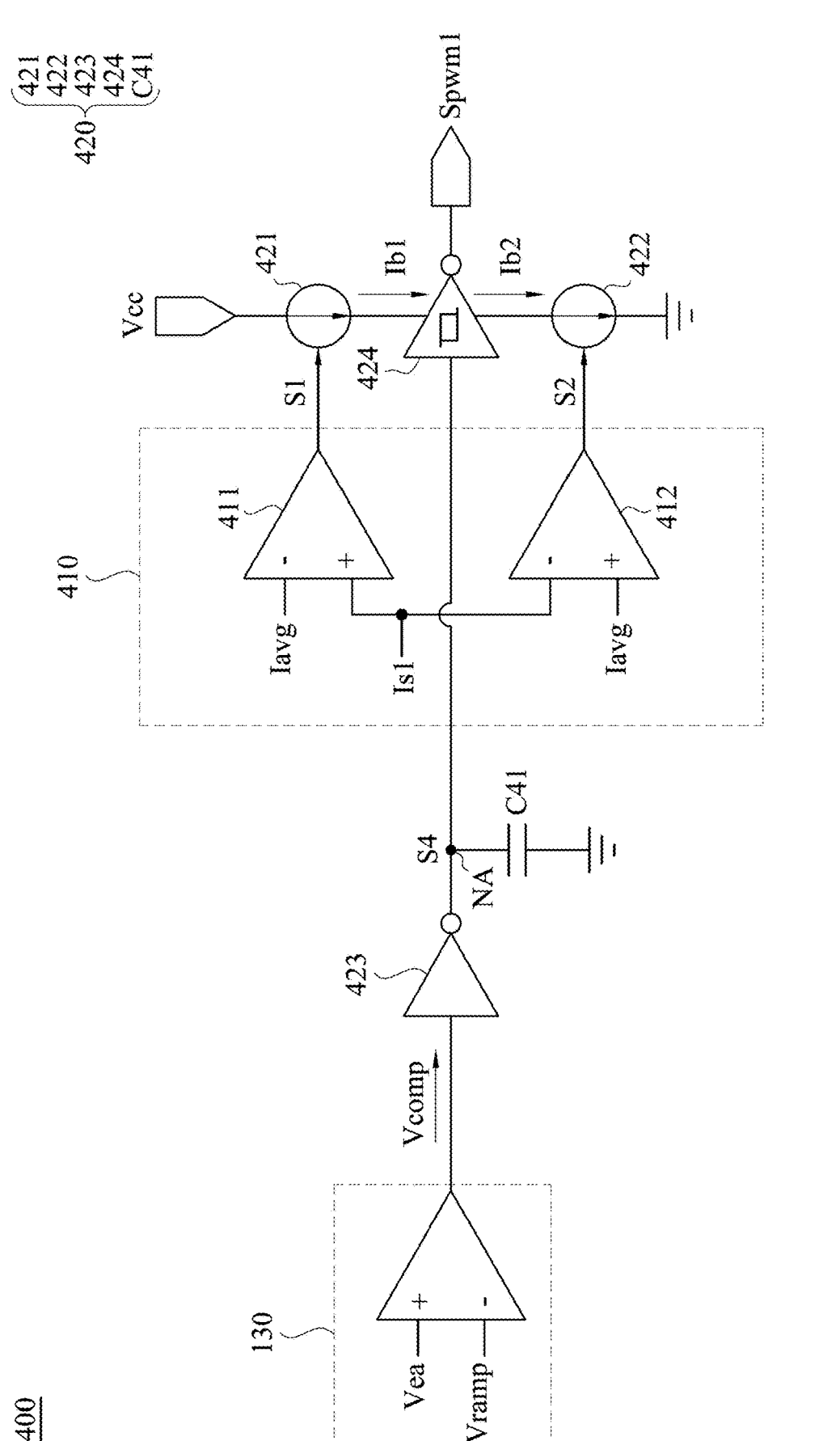
FIG. 4A is a schematic diagram of a voltage regulator circuit in some embodiments of the present disclosure.

FIG. 4A is a schematic diagram of a voltage regulator circuit 400 in some embodiments of the present disclosure, which can be applied to the multi-phase DC-DC converter 100 shown in FIG. 1A. The voltage regulator circuit shown in FIG. 4A can be an example of the voltage regulator circuit 200 shown in FIG. 1A. The voltage regulator circuit 400 comprises a current comparison circuit 410 and a delay circuit 420. The current comparison circuit 410 is coupled to the current detection circuit 121, and is configured to receive the error signal. The delay circuit 420 is coupled to the compensation circuit 130 and the current comparison circuit 410 to adjust a phase of a node signal S4 at a control node NA in the delay circuit 420 according to the error signal, thereby adjusting the duty cycle of the corresponding control signal Spwm1. The current comparison circuit 410 and the delay circuit 420 may be examples of the current comparison circuit 210 and the delay circuit 220 respectively.

As shown in FIG. 4A, in one embodiment, the current comparison circuit 410 comprises a first current comparator 411 and a second current comparator 412, and the delay circuit 420 comprises a first current source circuit 421 and a second current source circuit 422.

The first current comparator 411 is configured to receive the average current Iavg and the corresponding output current Is1 which is provided from the current detection circuit 121 and generate a first error signal S1 according to a difference between the average current Iavg and the output current Is1. The first current source circuit 421 is configured to provide a first bias current Ib1 and change the intensity of the first bias current Ib1 according to the first error signal S1. Similarly, the second current comparator 412 is configured to receive the average current Iavg and the corresponding output current Is1 from the current detection circuit 121 and generate a second error signal S2 according to a difference between the average current Iavg and the output current Is1. The second current source circuit 422 is configured to provide a second bias current Ib2 and change the intensity of the second bias current Ib2 according to the second error signal S2. In one embodiment, circuits of the first current comparator 411, the first current source circuit 421, the second current comparator 412 and the second current source circuit 422 are similar to circuits of the first current comparator 311, the first current source circuit 321, the second current comparator 312 and the second current source circuit 322 shown in FIG. 3A, so it will not be described here.

Specifically, as shown in FIG. 4A, the delay circuit 420 further comprises an inverter 423, a delay capacitor C41 and a hysteresis comparator 424. An input terminal of the inverter 423 is coupled to the output terminal of the compensation circuit 130, and is configured to receive the compensation signal Vcomp. An output terminal of the inverter 423 is coupled to the control node NA and the delay capacitor C41 to output the node signal S4. When the first error signal S1 is at a high level, the delay capacitor C41 is configured to delay a time point at which the node signal S4 is changed from a high logic level to a low logic level. When the first error signal S1 is at a low level, the delay capacitor C41 is configured to delay a time point at which the node signal S4 is changed from the low logic level to the high logic level.

An input terminal of the hysteresis comparator 424 is coupled to the output terminal of the inverter 423 to use the node signal S4 at the control node NA as an input voltage. A first correction terminal (e.g., a positive correction terminal) of the hysteresis comparator 424 is coupled to the first current source circuit 421 to receive the first bias current Ib1. A second correction terminal (e.g., a negative correction terminal) of the hysteresis comparator 424 is coupled to the second current source circuit 422 to receive the second bias current Ib2. An output terminal of hysteresis comparator 424 is configured to output the control signal Spwm1. The hysteresis comparator 424 is configured to generate the control signal Spwm1 according to the node signal S4, the first bias current Ib1 and/or the second bias current Ib2, and control charging or discharging of the delay capacitor C41 according to the intensity of the first bias current Ib1 and/or the second bias current Ib2 to adjust the phase of the node signal S4.

Figure 4B:
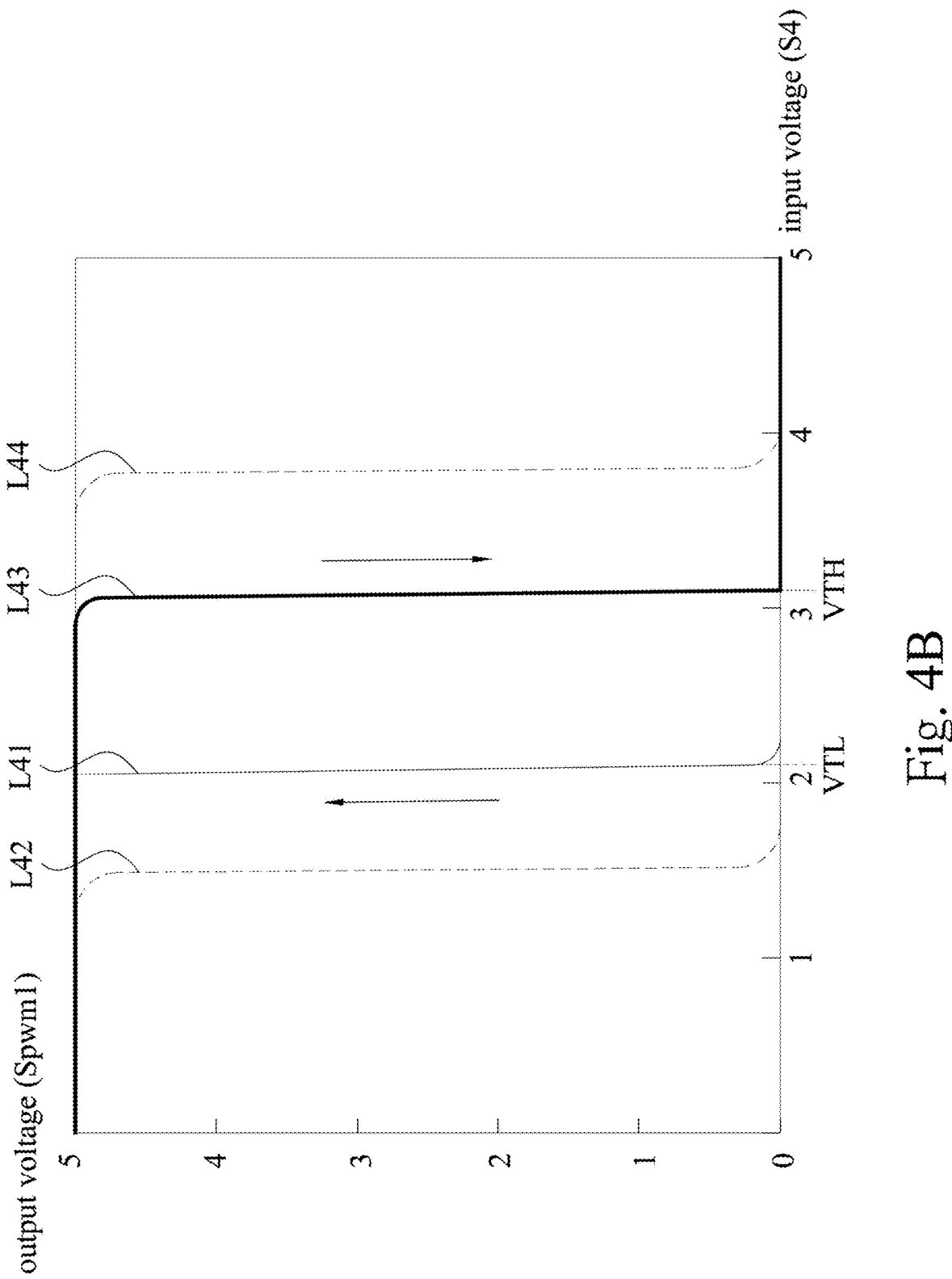
FIG. 4B is a voltage characteristic diagram of a hysteresis comparator in some embodiments of the present disclosure.

In one embodiment, the hysteresis comparator 424 can be implemented by a Schmitt trigger, whose voltage characteristic are shown in FIG. 4B above. A first threshold voltage VTH of the hysteresis comparator 424 is controlled and changed by the second bias current Ib2. For example, when the second bias current Ib2 increases, the first threshold voltage VTH also increases. Similarly, a second threshold voltage VTL of the hysteresis comparator 424 is controlled and changed by the first bias current Ib1. For example, when the first bias current Ib1 increases, the second threshold voltage VTL decreases.

When the first error signal S1 is at a high level, the first bias current Ib1 increases, thereby decreasing the second threshold voltage VTL (refer to FIG. 4B, the curve representing the voltage characteristic of the hysteresis comparator 424 is changed from the characteristic curve L41 to the characteristic curve L42), so the time point at which the node signal S4 is changed from a high logic level to a low logic level can be delayed. On the other hand, when the second error signal S2 is at a high level (i.e., the first error signal S1 is at a low level), the second bias current Ib2 will increase, thereby increasing the first threshold voltage VTH (refer to FIG. 4B, the curve representing the voltage characteristic of the hysteresis comparator 424 is changed from the characteristic curve L43 to the characteristic curve L44), so the time point at which the node signal S4 is changed from the low logic level to the high logic level can be delayed.

Referring to FIGS. 1A, 2 and 4A~4B, the following describes the delay circuit 420 that adjusts the bias current in the delay circuit according to the error signal (i.e., the first error signal S1 and the second error signal S2), thereby changing the duty cycle of the corresponding control signal Spwm1. When the power output stage circuit operates in the positive half cycle, that is, when the response voltage Vea is greater than the ramp voltage Vramp, the compensation signal Vcomp is at the high level, and the node signal S4 output by the inverter 423 should be the low logic level. If the output current Is1 is greater than the average current Iavg at this time, then the error signal S1 is at the high level and the error signal S2 is at the low level, so that the first current source circuit 421 is controlled to increase the bias current Ib1, and the second current source circuit 422 is controlled to decrease the bias current Ib2. When the first bias current Ib1 becomes larger and the second bias current Ib2 becomes smaller, the second threshold voltage VTL will decrease and the first threshold voltage VTH will increase. Therefore, as the second threshold voltage VTL decreases, the level of the control node NA (i.e., the node signal S4) needs to decrease to a lower level, so that the hysteresis comparator 424 can output the control signal Spwm1 with the high level. That is, the time point at which the control signal Spwm1 is switched to the high level is delayed, as shown in the waveform Spwm-B in FIG. 2. At this time, the time point at which the control signal Spwm1 increases to the high level will be delayed from the original time point P1 to the time point P2. Accordingly, it is equivalent to decreasing the duty cycle of the control signal Spwm1. When the duty cycle of the control signal Spwm1 decreases, the time during which the high-side switch Ta is turned on becomes shorter, thus decreasing the output current Is1 to achieve the purpose of maintaining balance among currents corresponding to different phases.

As for the power output stage circuit 110 operating in the positive half cycle, if the output current Is1 is less than the average current Iavg, the first bias current Ib1 decreases and the second bias current Ib2 increases, which does not affect the second threshold voltage VTL (but increases the first threshold voltage VTH), so the time point at which the node signal S4 is converted to the control signal Spwm1 with the high level is not affected. That is, the control signal Spwm1 is still switched to the high level at the time point P1, so the time point at which the waveform Spwm-C is switched to the high level during the positive half cycle is the same as the time point at which the waveform Spwm-A is switched to the high level.

Next, as shown in FIG. 2, when the power output stage circuit 110 operates in the negative half cycle, that is, when the response voltage Vea is less than the ramp voltage Vramp, the compensation signal Vcomp is at the low level, and the node signal S4 output by the inverter 423 becomes the high logic level. If the output current Is1 is less than the average current Iavg at this time, then the first error signal S1 is at the low level and the second error signal S2 is at the high level, so that the the first current source circuit 421 is controlled to decrease the first bias current Ib1 and the second current source circuit 322 is controlled to increase the second bias current Ib2. When the first bias current Ib1 becomes smaller and the second bias current Ib2 becomes larger, the first threshold voltage VTH increases. Therefore, the node signal S4 needs to increase to a higher level, so that the hysteresis comparator 424 can output the control signal Spwm1 with the low level. That is, the time point at which the control signal Spwm1 is switched to the low level will be delayed, as shown in the waveform Spwm-C shown in FIG. 2. At this time, the time point at which the control signal Spwm1 decreases to the low level will be delayed from the original the time point P3 to the time point P4. Accordingly, it is equivalent to increasing the duty cycle of the control signal Spwm1. When the duty cycle of the control signal Spwm1 increases, the time during which the high-side switch Ta is turned on becomes longer, thus increasing the output current Is1 to achieve the effect of balancing the currents corresponding to different phases.

As for the power output stage circuit 110 operating in the negative half cycle, if the output current Is1 is greater than the average current Iavg, the first bias current Ib1 will increase and the second bias current Ib2 will decrease, so the first threshold voltage VTH will not be affected (only the second threshold voltage VTL will be pulled down). That is, the time point at which the node signal S4 is converted into the control signal Spwm1 with the low level is not affected (still the time point P3), Therefore, in the negative half cycle, the time point at which the waveform Spwm-B is switched to the low level is the same as the time point at which the waveform Spwm-A is switched to the low level.

In the above embodiments, the voltage regulator circuit 400 comprises the first current comparator 411, the second current comparator 412, the first current source circuit 421 and the second current source circuit 422.

The first current comparator 411 and the corresponding first current source circuit 421 are configured to generate the first bias current Ib1 to change the first threshold voltage VTH and the second threshold voltage VTL of the hysteresis comparator 424. Similarly, the second current comparator 412 and the corresponding second current source circuit 422 are configured to generate the second bias current Ib2 to change the first threshold voltage VTH and the second threshold voltage VTL of the hysteresis comparator 424. However, in other embodiments, the voltage regulator circuit 400 can have the first bias current Ib1 or the second bias current Ib2, which can change the first threshold voltage VTH and the second threshold voltage VTL of the hysteresis comparator 424. In other words, in other embodiments, the voltage regulator circuit 400 may only comprise the first current comparator 411 and the corresponding first current source circuit 421, or only comprise the second current comparator 412 and the corresponding second current source circuit 422.

As mentioned above, the present disclosure adjusts the duty cycle of the control signal Spwm1 by the difference between the first output current Is1 and the average current Iavg, to achieve the purpose of maintaining balance among the output currents corresponding to different phases without changing the level of the response voltage Vea or the ramp voltage Vramp.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A multi-phase voltage regulator, coupled to a multi-phase direct current converter, and comprising:
   a plurality of voltage regulator circuits, coupled between a power output stage circuit and a compensation circuit, and configured to generate a plurality of control signals according to a compensation signal, so that the power output stage circuit generates a plurality of output currents,
   wherein one of the plurality of voltage regulator circuits comprises:
   a current comparison circuit, configured to obtain an error signal, wherein the error signal is a difference between a threshold current and a corresponding one of the plurality of output currents; and
   a delay circuit, coupled to the compensation circuit and the current comparison circuit, and configured to generate a corresponding one of the plurality of control signals according to the compensation signal, wherein the delay circuit is configured to adjust a bias current in the delay circuit according to the error signal to adjust a duty cycle of the corresponding one of the plurality of control signals.

2. The multi-phase voltage regulator of claim 1, wherein the delay circuit comprises a first current source circuit to provide a first bias current, and the current comparison circuit comprises:
   a first current comparator, wherein a first terminal of the first current comparator is configured to receive the threshold current, a second terminal of the first current comparator is configured to receive the corresponding one of the plurality of output currents, and the first current comparator outputs a first error signal to the first current source circuit to change the first bias current.

3. The multi-phase voltage regulator of claim 2, wherein the delay circuit further comprises a second current source circuit to provide a second bias current, and the current comparison circuit comprises:
   a second current comparator, wherein a first terminal of the second current comparator is configured to receive the corresponding one of the plurality of output currents, a second terminal of the second current comparator is configured to receive the threshold current, and the second current comparator outputs a second error signal to the second current source circuit to change the second bias current.

4. The multi-phase voltage regulator of claim 3, wherein the threshold current is an average current of the plurality of output currents.

5. The multi-phase voltage regulator of claim 4, wherein the delay circuit further comprises:
   an inverter, comprising an input terminal, an output terminal, a first correction terminal and a second correction terminal, wherein the input terminal of the inverter is coupled to an output terminal of the compensation circuit to receive the compensation signal, the first correction terminal of the inverter is configured to receive the first bias current, the second correction terminal of the inverter is configured to receive the second bias current, the output terminal of the inverter is configured to output a node signal, and the first bias current and the second bias current are configured to adjust a phase of the node signal; and
   a delay capacitor, coupled between the output terminal of the inverter and a reference terminal,
   wherein when the error signal is at a high level, the delay capacitor is configured to delay a time point at which the node signal is changed from a high logic level to a low logic level, and
   when the error signal is at a low level, the delay capacitor is configured to delay a time point at which the node signal is changed from the low logic level to the high logic level.

6. The multi-phase voltage regulator of claim 5, wherein the delay circuit further comprises:
   a hysteresis comparator, coupled to the output terminal of the inverter, and configured to generate the corresponding one of the plurality of control signals according to the node signal.

7. The multi-phase voltage regulator of claim 4, wherein the delay circuit further comprises:
   an inverter, comprising an input terminal and an output terminal, wherein the input terminal of the inverter is configured to receive the compensation signal, and the the output terminal of the inverter is configured to output a node signal.

8. The multi-phase voltage regulator of claim 7, wherein the delay circuit further comprises:

a hysteresis comparator, coupled to the output terminal of the inverter, comprising an input terminal, an output terminal, a first correction terminal and a second correction terminal, wherein the input terminal of the hysteresis comparator is coupled to an output terminal of the inverter to receive the node signal from the inverter, the first correction terminal of the hysteresis comparator is configured to receive the first bias current, and the second correction terminal of the hysteresis comparator is configured to receive the second bias current, and wherein the hysteresis comparator is configured to generate the corresponding one of the plurality of control signals according to the node signal, the first bias current and the second bias current.

9. The multi-phase voltage regulator of claim 8, wherein a first threshold voltage and a second threshold voltage of the hysteresis comparator are changed by the first bias current and the second bias current;

wherein when the error signal is at a high level, the second threshold voltage is decreased to delay a time point at which the node signal is changed from a high logic level to a low logic level, and when the error signal is at a low level, the first threshold voltage is increased to delay a time point at which the node signal is changed from the low logic level to the high logic level.

10. The multi-phase voltage regulator of claim 1, wherein the compensation signal is generated according to a difference between a feedback voltage provided by an output terminal the multi-phase direct current converter and a reference voltage.

11. A multi-phase current balancing circuit, applied to a multi-phase direct current converter, comprising:

a current detection circuit, coupled to a power output stage circuit of the multi-phase direct current converter to receive a plurality of output currents and a threshold current; and a plurality of voltage regulator circuits, coupled to between the current detection circuit and a compensation circuit of the multi-phase direct current converter, and configured to generate a plurality of control signals according to a compensation signal, so that the power output stage circuit generates the plurality of output currents;

wherein one of the plurality of voltage regulator circuits comprises:

a current comparison circuit, configured to obtain an error signal, wherein the error signal is a difference between the threshold current and a corresponding one of the plurality of output currents; and a delay circuit, coupled to the compensation circuit and the current comparison circuit, and configured to generate a corresponding one of the plurality of control signals according to the compensation signal, wherein the delay circuit is configured to adjust a bias current in the delay circuit according to the error signal to adjust a duty cycle of the corresponding one of the plurality of control signals.

12. The multi-phase current balancing circuit of claim 11, wherein the delay circuit comprises a first current source circuit to provide a first bias current, and the current comparison circuit comprises:

a first current comparator, coupled to the current detection circuit, wherein a first terminal of the first current comparator is configured to receive the threshold current, a second terminal of the first current comparator is configured to receive the corresponding one of the plurality of output currents, and the first current comparator outputs a first error signal to the first current source circuit to change the first bias current.

13. The multi-phase current balancing circuit of claim 12, wherein the delay circuit further comprises a second current source circuit to provide a second bias current, and the current comparison circuit comprises:

a second current comparator, coupled to the current detection circuit, wherein a first terminal of the second current comparator is configured to receive the corresponding one of the plurality of output currents, a second terminal of the second current comparator is configured to receive the threshold current, and the second current comparator outputs a second error signal to the second current source circuit to change the second bias current.

14. The multi-phase current balancing circuit of claim 13, wherein the current detection circuit is configured to calculate an average current of the plurality of output currents as the threshold current.

15. The multi-phase current balancing circuit of claim 14, wherein the delay circuit further comprises:

an inverter, comprising an input terminal, an output terminal, a first correction terminal and a second correction terminal, wherein the input terminal of the inverter is coupled to an output terminal of the compensation circuit to receive the compensation signal, the first correction terminal of the inverter is configured to receive the first bias current, the second correction terminal of the inverter is configured to receive the second bias current, the output terminal of the inverter is configured to output a node signal, and the first bias current and the second bias current are configured to adjust a phase of the node signal; and a delay capacitor, coupled between the output terminal of the inverter and a reference terminal, wherein when the error signal is at a high level, the delay capacitor is configured to delay a time point at which the node signal is changed from a high logic level to a low logic level, and when the error signal is at a low level, the delay capacitor is configured to delay a time point at which the node signal is changed from the low logic level to the high logic level.

16. The multi-phase current balancing circuit of claim 15, wherein the delay circuit further comprises:

a hysteresis comparator, coupled to the output terminal of the inverter, and configured to generate the corresponding one of the plurality of control signals according to the node signal.

17. The multi-phase current balancing circuit of claim 14, wherein the delay circuit further comprises:

an inverter, comprising an input terminal and an output terminal, wherein the input terminal of the inverter is configured to receive the compensation signal, and the the output terminal of the inverter is configured to output a node signal.

18. The multi-phase current balancing circuit of claim 17, wherein the delay circuit further comprises:

a hysteresis comparator, coupled to the output terminal of the inverter, comprising an input terminal, an output terminal, a first correction terminal and a second correction terminal, wherein the input terminal of the hysteresis comparator is coupled to an output terminal of the inverter to receive the node signal from the inverter, the first correction terminal of the hysteresis comparator is configured to receive the first bias current, and the second correction terminal of the hysteresis comparator is configured to receive the second bias current, and wherein the hysteresis comparator is configured to generate the corresponding one of the plurality of control signals according to the node signal, the first bias current and the second bias current.

19. The multi-phase current balancing circuit of claim 18, wherein a first threshold voltage and a second threshold voltage of the hysteresis comparator are changed by the first bias current and the second bias current;

wherein when the error signal is at a high level, the second threshold voltage is decreased to delay a time point at which the node signal is changed from a high logic level to a low logic level, and when the error signal is at a low level, the first threshold voltage is increased to delay a time point at which the node signal is changed from the low logic level to the high logic level.

20. The multi-phase current balancing circuit of claim 11, wherein the compensation signal is generated according to a difference between a feedback voltage provided by an output terminal the multi-phase direct current converter and a reference voltage.

* * * * *